United States Patent [19]

Perkins

[11] Patent Number: 4,783,230
[45] Date of Patent: Nov. 8, 1988

[54] MANUFACTURE OF PLY FABRIC FOR REINFORCED RUBBER ARTICLES

[75] Inventor: David J. B. Perkins, Liverpool, England

[73] Assignee: W & A Bates Limited a British Company, United Kingdom

[21] Appl. No.: 8,136

[22] Filed: Jan. 22, 1987

Related U.S. Application Data

[63] Continuation of Ser. No. 764,529, Aug. 12, 1985, abandoned, which is a continuation of Ser. No. 555,989, Nov. 29, 1983, abandoned.

[30] Foreign Application Priority Data

Dec. 16, 1982 [GB] United Kingdom ............... 8235778

[51] Int. Cl.⁴ .............................................. B32B 1/00
[52] U.S. Cl. .................................. 156/117; 156/130; 156/174; 156/193; 156/195; 156/397; 156/405.1; 425/363; 425/DIG. 235
[58] Field of Search ............... 156/130, 131, 171, 174, 156/397, 195, 193, 126, 117, 405.1, 406.2, 406.4, 437, 555; 425/141, 194, 409, 418, 201, 202, 363, 367, 327, 335, DIG. 235; 264/210.1; 26/175

[56] References Cited

U.S. PATENT DOCUMENTS

| | | | |
|---|---|---|---|
| 1,643,202 | 9/1927 | Denmire | 156/406.2 |
| 1,736,911 | 11/1929 | Gray | 156/187 |
| 2,620,320 | 12/1952 | Novak et al. | 264/175 |
| 3,230,127 | 1/1966 | Cleerman et al. | 264/175 |
| 3,262,826 | 7/1966 | Balkin et al. | 156/171 |
| 3,418,191 | 12/1968 | Dieckmann et al. | 156/130 |
| 3,470,286 | 9/1969 | Weber | 26/167 |
| 3,543,333 | 12/1970 | Anders et al. | 425/141 |
| 3,549,442 | 12/1970 | Hineline | 156/117 |
| 3,954,538 | 5/1976 | Grawey | 156/397 |
| 4,007,080 | 2/1977 | Klopper | 156/406.2 |
| 4,105,488 | 8/1978 | Hayes et al. | 156/405.1 |
| 4,126,720 | 11/1978 | Edwards | 156/117 |
| 4,240,863 | 12/1980 | Vinton | 156/130 |

FOREIGN PATENT DOCUMENTS

| | | |
|---|---|---|
| 216770 | 6/1924 | United Kingdom . |
| 919078 | 2/1963 | United Kingdom . |
| 960488 | 6/1964 | United Kingdom . |
| 1380618 | 1/1975 | United Kingdom . |

*Primary Examiner*—David Simmons
*Attorney, Agent, or Firm*—Stevens, Davis, Miller & Mosher

[57] ABSTRACT

This invention concerns the manufacture of a layer of elastomeric material to form part of a pneumatic tire, and the manufacture of a reinforced elastomeric layer.

According to the invention a layer of elastomeric material is formed as a progressive helical winding along a mandrel. The layer may be transferred in cylindrical form to a tire carcass building former to constitute an inner lining for a tire carcass, or a reinforcement filament may be wound over the layer producing a cylindrical reinforced layer which is cut to produce a ply of coated fabric.

12 Claims, 5 Drawing Sheets

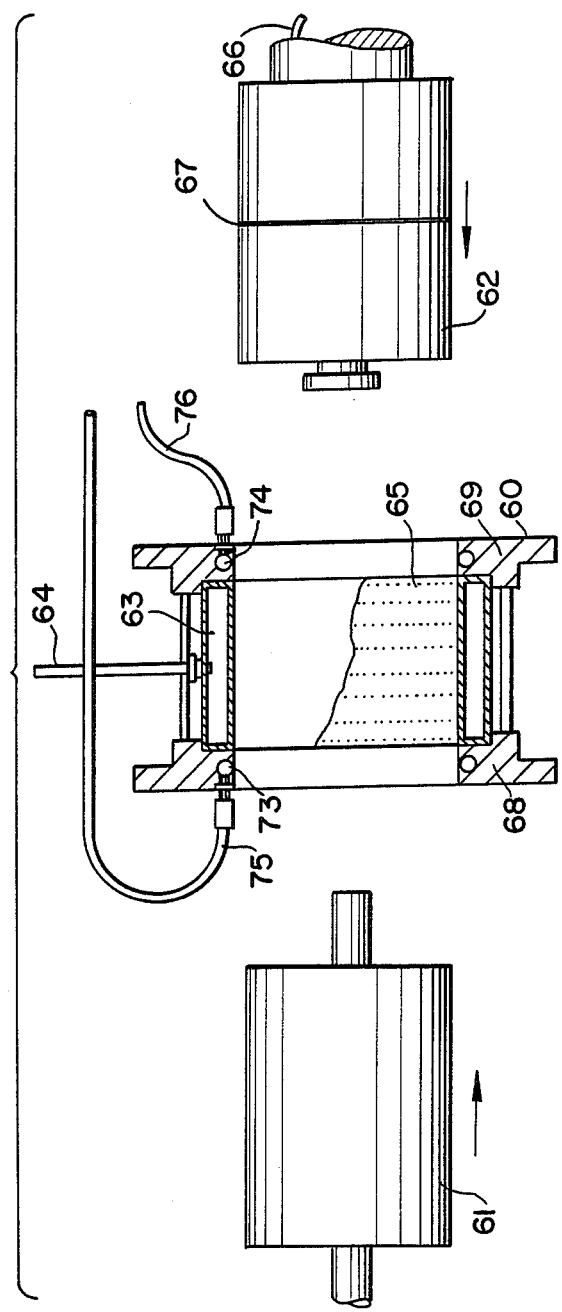

MANUFACTURE OF PLY FABRIC FOR REINFORCED RUBBER ARTICLES

This invention is a continuation of application Ser. No. 764,529, filed Aug. 12, 1985, now abandoned, which is a continuation of Ser. No. 555,989, filed Nov. 29, 1983, now abandoned.

This invention relates generally to the manufacture of rubber and fabric components for reinforced rubber articles, and particularly to the manufacture of inner liners and parallel-cord plies for use in the manufacture of pneumatic tire.

In the manufacture of rubber liners and ply fabric sheets for the manufacture of pneumatic tire, it is normal practice to use a large calender to produce a strip of such sheet material approximately 1½ meters in width.

The apparatus used in the conventional process is extremely expensive. and very bulky, and requires constant supervision by a number of operators.

One object of the present invention is to provide a method and apparatus for producing sheet rubber and ply fabric which does not entail high capital and operating costs.

According to one aspect of the invention, a method of manufacturing a layer of elastomeric material to form part of a pneumatic tire comprises winding unvulcanized elastomeric strip as a progressive helical winding along a mandrel to produce a layer of said material thereon suitable to be built into a pneumatic tire carcass.

If the layer of elastomeric material is intended to form an inner liner for a pneumatic tire the method in accordance with the invention may comprise disengaging the layer from the mandrel and transferring the layer in cylindrical form to the interior surface of a carrier, positioning the carrier around a tire carcass building former and transferring the layer to the tire building former to constitute an inner lining for a tire carcass.

According to another aspect of the invention, a method of manufacturing a ply of parallel-cord fabric comprises winding elastomeric strip as a progressive helical winding along a mandrel to produce a layer of elastomer theron, winding a reinforcement filament as a progressive helical winding over the said layer and in intimate engagement therewith to form a cylindrical reinforced elastomeric layer on the mandrel, and cutting the cylindrical layer to produce therefrom a ply of parallel-cord elastomer coated fabric.

Normally, in the manufacture of ply fabric for pneumatic tire, a first layer of unvulcanized rubber is applied to the mandrel, the cord reinforcement is applied and a second layer of rubber is applied over the reinforcement.

According to the invention also, apparatus for manufacturing a ply of parallel-cord fabric comprises means for winding elastomeric strip as a progressive helical winding along a mandrel to produce a layer of elastomer thereon, means for winding a reinforcement filament as a progressive helical winding over the layer of elastomer so as to be intimate engagement therewith to form a cylindrical reinforced layer of elastomer on the mandrel, and means for cutting the cylindrical layer to produce therefrom a ply of parallel-cord fabric.

The term "rubber" is used in this specification to embrace natural or synthetic elastomeric material, which is normally unvulcanized at the stage where it is applied to the mandrel.

The reinforcement filament may be of any conventional kind as normally used in the production of pneumatic tire, for example rayon, nylon or steel. The filament may be in the form of cord, chemically pre-treated to enable it to adhere to rubber, but no rubber coating needs to be applied to the filament before the winding operation: this is a significant advantage of the invention since the handling problems involved in the use of rubberized cord are eliminated.

One embodiment of the invention will now be described, by way of example, with reference to the accompanying drawings in which:

FIG. 6 is a plan view, partly in cross-section, of apparatus for manufacturing an inner liner;

The basic principles of construction and operation of the apparatus in accordance with the invention are shown in the diagrams of FIGS. 1 to 5.

Figure 1:
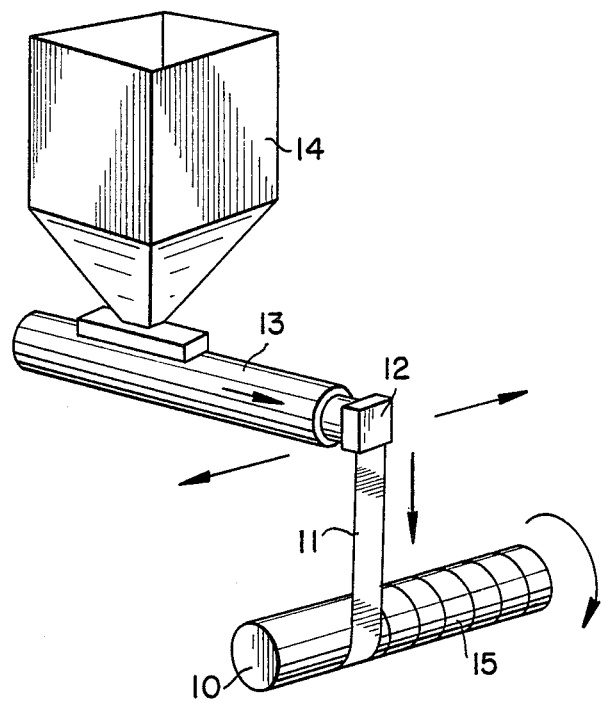
FIGS. 1–5 show diagrammaticaly a sequence of operations in accordance with the invention.

FIG. 1 shows a mandrel 10 which is rotatable and is positioned to receive a narrow extruded strip of uncured rubber 11 from a die 12 of an extruder 13 which is supplied with rubber compound in pellet form from a hopper 14. As illustrated in FIG. 1 the extruder die is arranged to be moved longitudinally of the mandrel so as to lay a continuous helical winding of rubber strip, about 20 millimeters in width and 0.30 millimeters in thickness, on to the mandrel which is driven at an appropriate speed to build up a layer of rubber 15. The edges of the windings may abut so that the layer 15 is of uniform thickness throughout, or the edges of the strip 11 as it is wound around the mandrel may be caused to overlap slightly to ensure continuity (by about 0.5 millimeters). While in the diagram of FIG. 1 the progressive longitudinal movement of the strip 11 is effected by moving the die of the extruder, in a practical apparatus a pivoted conveyor may be employed for this purpose.

Figure 2:
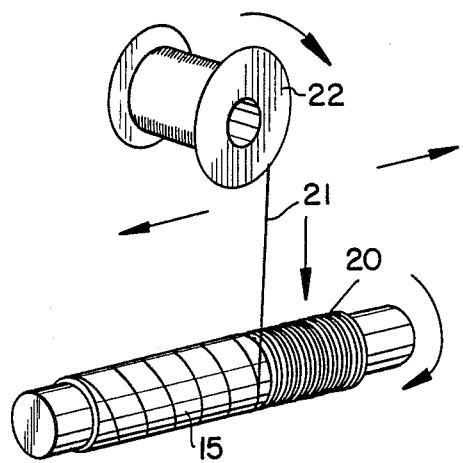

In a second stage of the process, as shown in FIG. 2, a single layer 20 of unrubberized textile cord 21, which has been chemically treated to enable it to adhere to rubber, is wound around the mandrel from a reel 22, the cord 21 being guided from the reel to the mandrel.

The cord layer 20 is wound tightly around the rubber layer 15 at constant tension and pitch, the tension being sufficient to cause the cord to be embedded in and firmly adhered to the rubber layer while not cutting through the rubber layer. The winding is terminated when a sufficient length of the cord layer 20 has been applied to provide a ply of appropriate length for a subsequent tire building process, and the cord is then severed.

Figure 3:
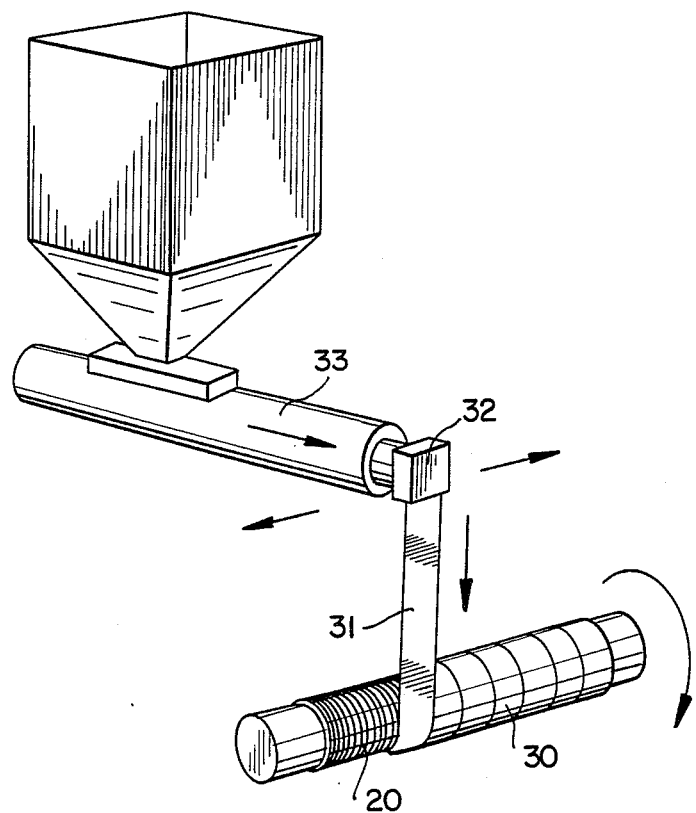

FIG. 3 shows a third stage of the method in which a second rubber layer 30 is applied by winding a rubber strip 31 from the die 32 of an extruder 33, the layer 30 being applied in a similar manner to the layer 15 shown in FIG. 1. Preferably, the winding direction of the layer 30 is in the opposite sense to that of the layer 15 to avoid the possibility of coincident gaps appearing in the two layers. A consolidation roller (not shown) is applied to the second rubber layer as it is wound on to the mandrel.

Figure 4:
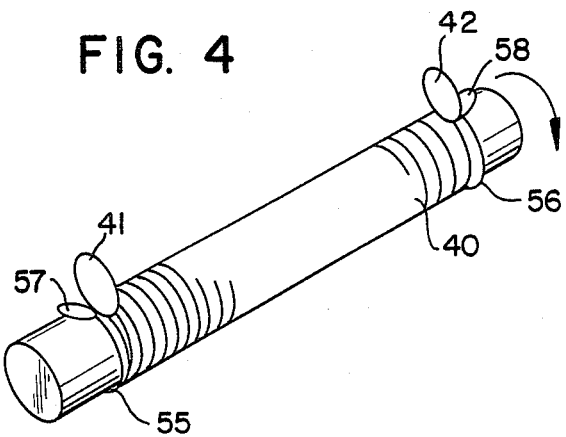

Following the application of the second rubber layer as seen in FIG. 3, the mandrel is passed to a fourth stage, illustrated in FIG. 4 where surplus rubber 55,56 at the ends of the cylindrical ply layer 40 is trimmed away by rotary knives 41 and 42 and spun away from the ply edge by angled spinner discs 57,58. An additional knife mechanism (not shown) cuts the surplus rubber and allows it to fall clear from the mandrel.

Figure 5:
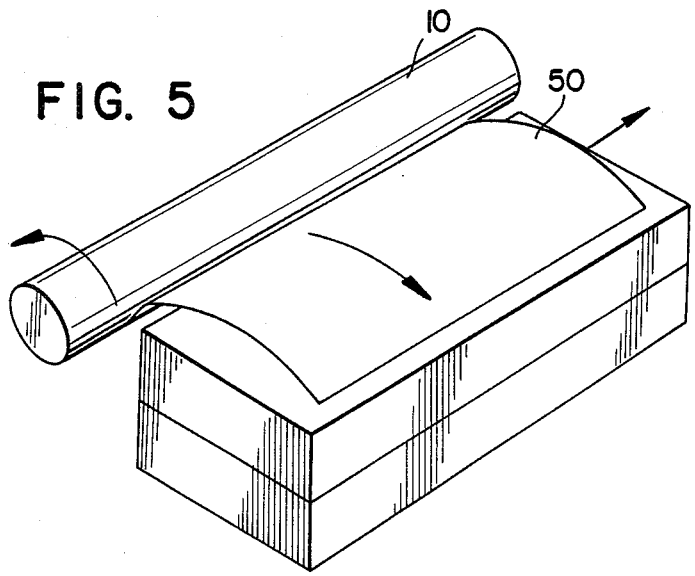

The fifth stage of the ply manufacturing operation, as shown in FIG. 5, consists of slitting the layer 40 longitudinally with respect to the mandrel 10 to produce a flat finished ply 50 which is then drawn away from the mandrel onto a take-off conveyor.

Variations in the method and apparatus described above may be made without departing from the principle of the invention. For example, the rubber layers may be wound with the edges of the successive windings slightly separated, provided that the reinforcement cord layer is wound at sufficiently close pitch to hold the complete ply sheet together when it is removed from the mandrel. The helix angle of the second rubber layer may be arranged to be the same as, or in the opposite sense to, that of the first rubber layer by traversing the laying head in the same direction or in opposite directions to form the respective layers: by winding the rubber layers in opposite directions better stability of the finished ply may be achieved.

While in the embodiment described above the cords in the finished ply are at substantially 90° to the cut ends of the ply, other cord bias angles may be achieved by a controlled rotation of the mandrel as a knife is traversed along it to sever the ply.

Apparatus similar to that described above but without cord winding and severing facilities may also be used to prepare pneumatic tire inner linings, wholly of elastomeric material, which comprise a helical winding of rubber strip around a mandrel. Such linings are particularly suitable for use in the method and apparatus described in the specification of our co-pending application No. 8328737.

FIG. 6 shows a carrier ring assembly 60 which is mounted coaxially with a tire building former 61 and a mandrel 62. The arrangement is such that an inner liner may be built on the mandrel 62 as described above and moved axially into the carrier ring assembly 60 to which it may be transferred by the action of a vacuum chamber 63 connected via a pipe 64 to a vacuum source and having a perforated cylindrical inner wall 65 formed from or coated with a non-stick material such as PTFE. Annular inwardly projecting ribs (not shown) are provided one at each end of the carrier ring to seal the ends of the liner to the carrier ring during the application of vacuum. A pipe 66 is provided to connect a central annular groove 67 in the surface of the mandrel to a source of air pressure to assist release of the wound rubber lining layer from the material. Alternatively the mandrel may be provided with an expansible rubber sleeve, covering its outer surface, to enable the liner to be expanded outwardly into engagement with the carrier ring.

By removing the mandrel 62 and arranging the tire building former 61 in an accurately determined position within the carrier 60 the liner may then be transferred to the former by expansion of the former into the liner. To release the liner from the carrier, the former is contracted and air pressure may be supplied through the pipe 64 to assist release of the liner. End flanges 68 and 69 of the carrier ring assembly are also formed with annular grooves 73,74 which are connected by pipes 75,76 to a source of air pressure to assist in transferring the edges of the lining layer to the tire building former. Alternatively, the carrier ring assembly may be constructed so that it can be split in an axial plane into two half portions which are hinged so that they may be separated to disengage them from the liner on the former before contracting the former.

Figures 7, 8, 9:
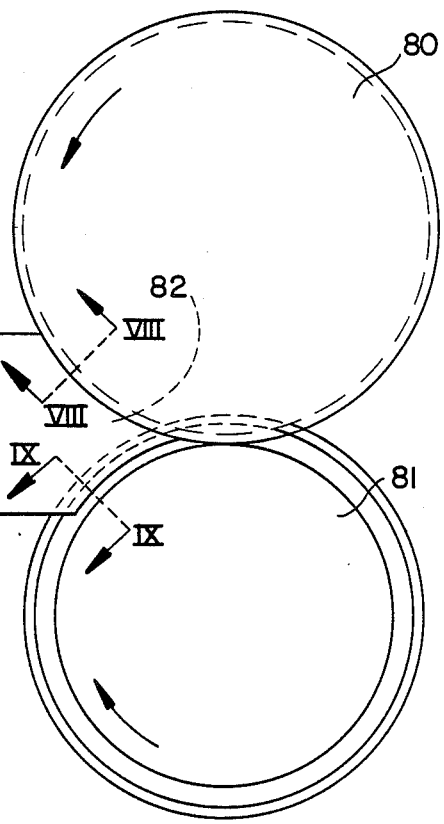
FIG. 7 is a detail end view of part of apparatus for producing rubber strip.
FIG. 8 is a scrap cross-section on the line VIII—VIII of FIG. 7.
FIG. 9 is a scrap cross-section on the line IX—IX of FIG. 7.

FIGS. 7–9 illustrate an alternative means for the production of a narrow rubber strip (20 millimeters in the case of a ply coating layer and 40 millimeters in the case of a rubber liner) to be wound around the mandrel, using a very small calender. A pair of interengaging calender rolls 80,81 are arranged to produce a narrow calendered strip from a warm rubber strip of circular cross-section fed directly from an extruder into a nip 82 between them. The roll 80 is recessed, having flanges 83,84 which fit closely to cheeks 85,86 of the outer portion of the roll 81 which are undercut as shown in FIG. 9. The thickness of the calendered strip produced may be of the order of 0.3 millimeters for a ply coating layer and 0.7 millimeters for an inner lining.

A plow 90 comprises side plates 91 and 92 which fit to and conform with the outer surfaces of the flanges 83,84 of the roll 80 (FIG. 8) and with the cheeks 85,86 of the roll 81 (FIG. 9). By this means, the rubber strip emerging from the calender is held to accurately predetermined thickness and width measurements.

By the use of a suitably profiled nip between the rolls 80,81 the edges of the strip may be tapered or rebated, for example over a width of 2 millimeters from the edge in the case of a winding to form a liner to help to produce a smooth and continuous layer of rubber on the mandrel by overlaying the tapered or rebated portions.

I claim:

1. A method of manufacturing a layer of unreinforced elastomeric material to form part of a pneumatic tire comprising producing a warm unvolcanized elastomeric strip from an extruder, directly feeding the extrudate strip to a calender means to produce a thin unvulcanized elastomeric strip of a thickness of 0.3 mm–0.7 mm, winding the unvulcanized elastomeric strip as a progressive helical winding along a mandrel with the edges of the strip being substantially butted against one another to produce a substantially continuous uniform thin layer of said material thereon suitable to be built into a tire carcass, the disengaging the layer from the mandrels, transferring the layer in cylindrical form to the interior surface of a carrier, positioning the carrier around a tire carcass building former and transferring the layer to the tire bulilding former to constitute an inner lining for a tire carcass.

2. A method of manufacturing a pneumatic tire comprising the steps of:
   (i) producing a warm unvulcanized elastomeric strip from an extruder,
   (ii) directly feeding the warm elastomeric strip to a calender means, producing a thin unvulcanized, unreinforced elastomeric strip of a thickness of 0.3 mm to 0.7 mm by means of the calender,
   (iii) winding the unreinforced strip as a progressive helical winding along a cylindrical mandrel with the edges of the strip being substantially butted against one another to produce a cylindrical ply of substantially uniform thickness,
   (iv) removing the ply from the mandrel and
   (v) utilizing said cylindrical ply in a further stage of the tire manufacture.

3. A method of manufacturing a ply of parallel-cord reinforced fabric to form part of a pneumatic tire comprising producing a warm unvulcanized elastomeric strip from an extruder, directly feeding the extrudate strip to a calender means to produce an elastomeric strip of a thickness of 0.3 mm–0.7 mm, winding the elastomeric strip as a progressive helical winding along a mandrel with the edges of the strip being substantially butted against one another to produce a substantially continuous uniform thin layer of elastomer thereon, tensioning and winding a reinforcement filament as a progressive helical winding over the said layer and in intimate engagement therewith to form a cylindrical reinforced elastomeric layer on the mandrel, said tensioning step being sufficent to embed the reinforcement in said elastomeric strip, and cutting the cylindrical layer along an axial line to produce therefrom a ply of parallel-cord elastomer coated fabric and then transferring the ply, as a flat sheet, to a former for building a tire.

4. Apparatus for manufacturing a carcass ply for a tire comprising an extruder for converting rubber compound in pellet form into a warm elastomeric strip, a calender means to receive the extrudate comprising a pair of interengaging calender rolls, one of the calender rolls and a plow means, one of the calender rolls being recessed and having a flange on each side of said recess and the other roll of said pair being sized and shaped to interengage with said one calender roll to form a nip between said calender rolls, said plow means having side plate which conform with the flanges on said one roll and the interengaging portion on said other roll, said nip being of a size to form an elastomeric strip of controlled width and a thickness of 0.3 mm–0.7 mm, said calender means positioned to receive the warm elastomeric strip from the extruder, a mandrel, and a means for winding said strip of elastomeric material as a progressive helical winding along the mandrel with the edges of the strip being substantially butted against one another to produce a substantially continuous uniform thin layer of elastomer thereon, and means for removing said layer from the mandrel.

5. Apparatus according to claim 4 for manufacturing a ply of parallel-cord fabric comprising means for tensioning and winding a reinforcement filament as a progressive helical winding over a layer of elastomer so as to be in intimate engagement therewith to form a cylindrical layer of reinforced elastomer on the mandrel, and means for cutting the cylindrical layer to produce therefrom a ply of parallel-cord fabric.

6. Apparatus according to claim 4 wherein carrier ring means is provided for transferring the layer of elastomer to a tyre building former.

7. Apparatus according to claim 6 wherein the carrier ring means comprises means for applying vacuum to a layer of elastomer to assist in transferring the layer to the carrier ring means from the mandrel.

8. Apparatus according to claim 6 wherein the mandrel comprises means for supplying air pressure to the surface of the mandrel to assist release of a layer of elastomer from the mandrel.

9. Apparatus according to claim 6 wherein the mandrel is provided with an expansible sleeve covering its outer surface to enable the layer to be expanded into engagement with the carrier ring means.

10. Apparatus according to claim 6 wherein the carrier ring means comprises means for applying air pressure to assist in transferring a layer of elastomer from the carrier to a tyre building former.

11. Apparatus according to claim 4 wherein the calender comprising a pair of rollers having peripheries spaced to define a nip therebetween, one roller having a pair of side plates which extend radially outwardly to define a generally "U" shaped cross section which fits over the radial outer sides of the other roller to define a nip width to accurately control the width of the material passing therethrough.

12. Apparatus according to claim 11 in which said other roller has circumferentially extending grooves along the radially outer potions of each of its sides, said side plates interfitting into said grooves.

* * * * *